April 21, 1959 C. D. SHAW 2,882,980
HARROW LIFT ATTACHMENT
Filed April 11, 1956 3 Sheets-Sheet 1
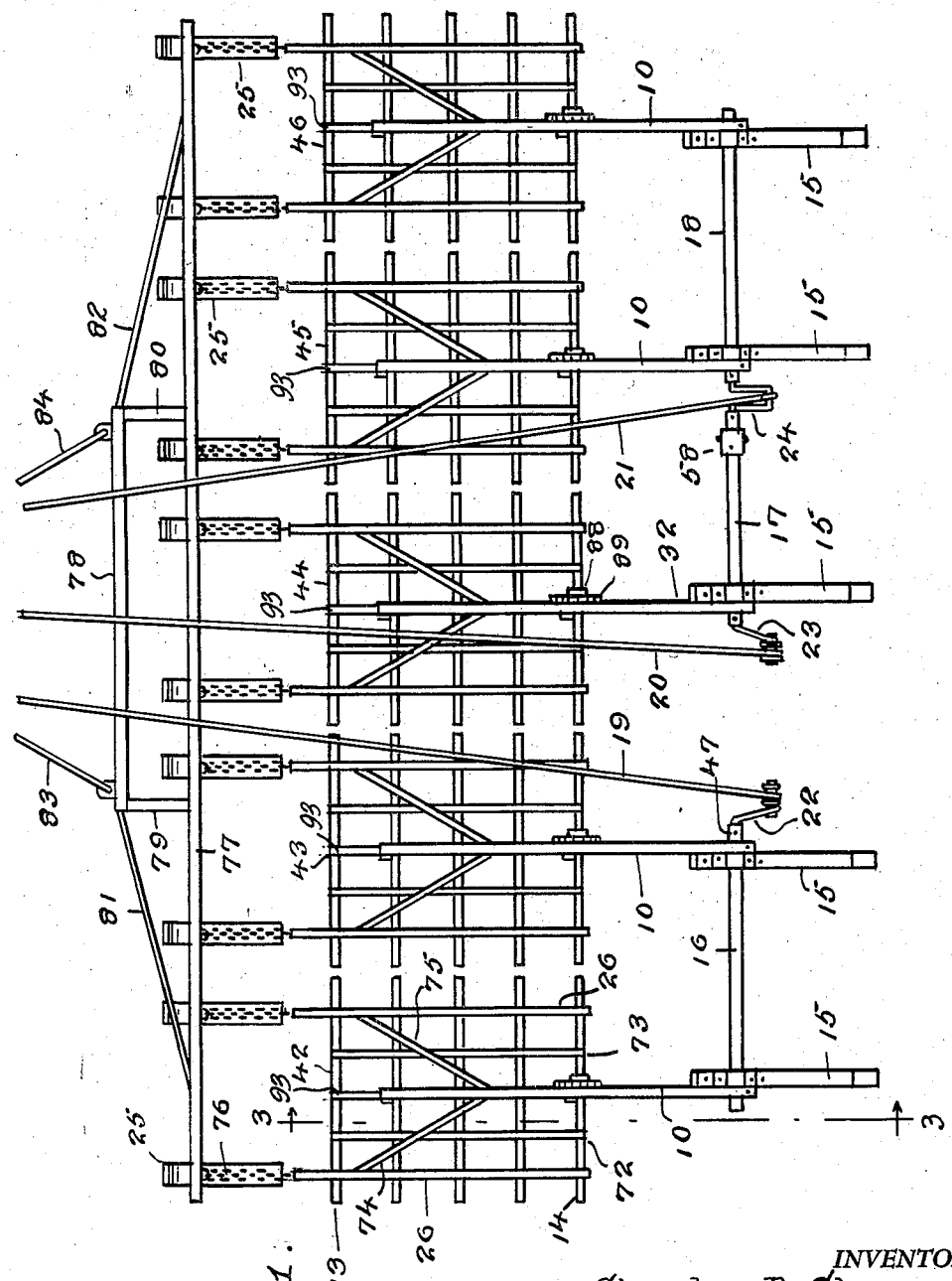
INVENTOR.
Charles D. Shaw
BY *Victor J. Evans & Co.*
ATTORNEYS

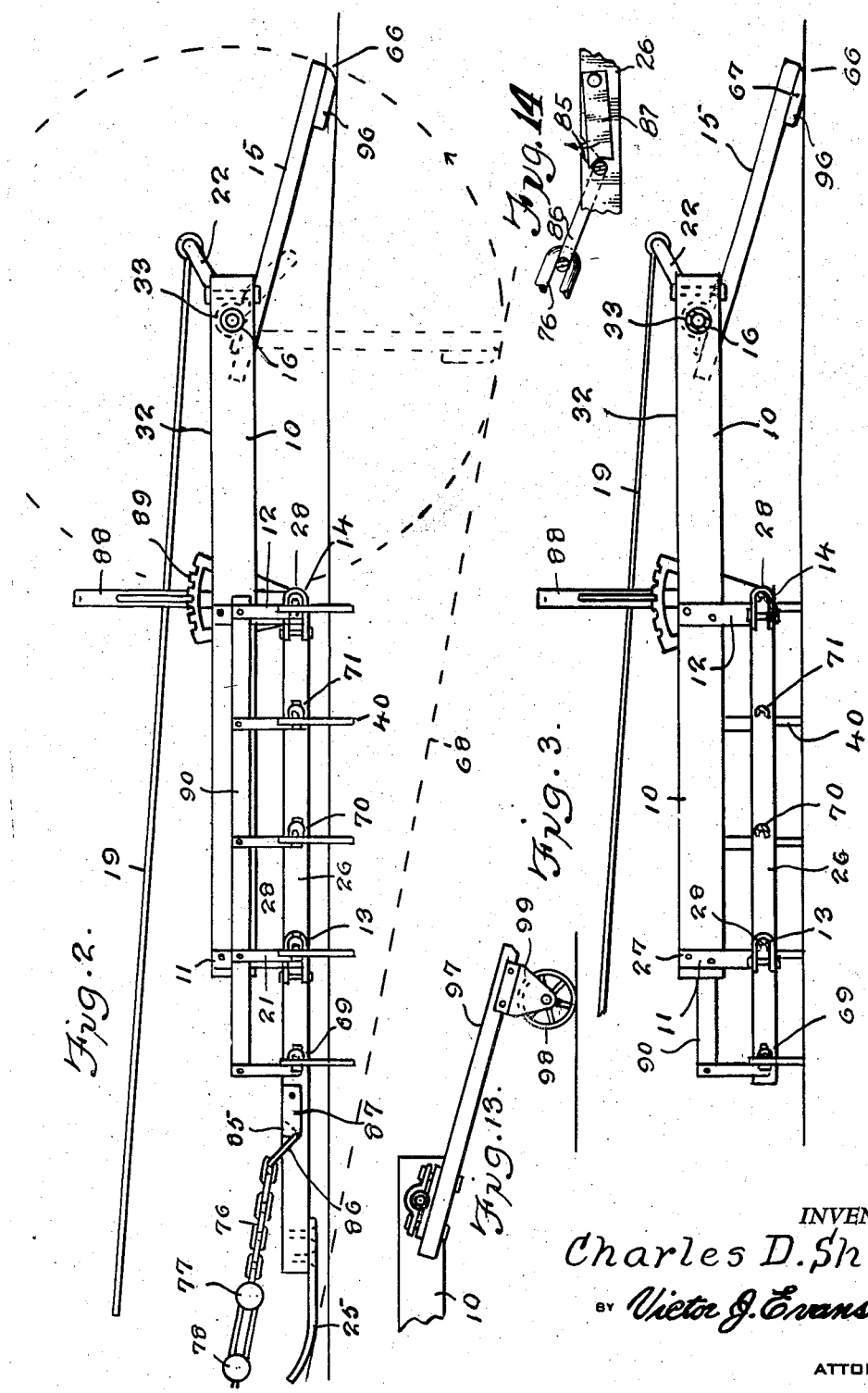

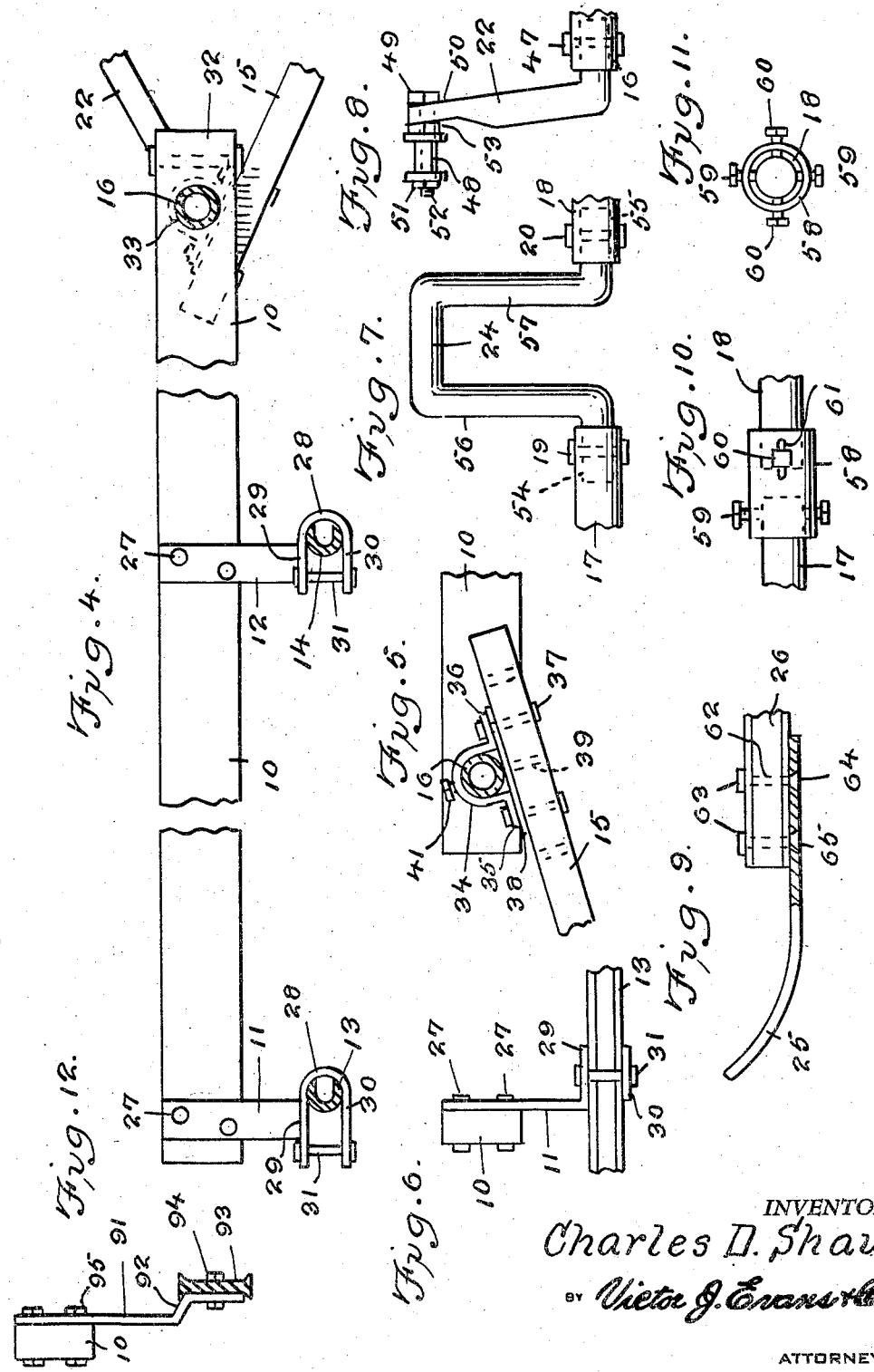

United States Patent Office 2,882,980
Patented Apr. 21, 1959

2,882,980

HARROW LIFT ATTACHMENT

Charles D. Shaw, McPherson, Kans.

Application April 11, 1956, Serial No. 577,542

1 Claim. (Cl. 172—236)

This invention relates to agricultural implements and particularly harrows of the spike and spring tooth type, and in particular arms rotatably mounted on extended ends of beams secured to harrow frames whereby the arms are adapted to be drawn forwardly with cables from the seat of a towing tractor so that upon engagement with the soil the arms elevate the harrow frames giving trash and the like an opportunity to drop from the harrow teeth and wherein after elevating the harrow to clean the teeth the arms extend rearwardly dragging over the soil.

The purpose of this invention is to provide an attachment for a harrow wherein the harrow teeth may be elevated above the ground to clean the teeth as the harrow is in use.

In dragging harrows over soil in fields and particularly fields in which a crop of corn has been removed the teeth of the harrow pick up weeds, corn stalks, and other trash and it is necessary for an operator to stop to clean the teeth at regular intervals. With this thought in mind this invention contemplates means whereby an operator of a tractor dragging a harrow may readily elevate the harrow so that the teeth are temporarily in spaced relation to the ground and wherein after being elevated the frames of the harrow drop downwardly to contact the surface of the soil.

The object of this invention is, therefore, to provide elevating means for a harrow wherein harrow sections are readily elevated above the soil by an operator upon the seat of a towing tractor.

Another object of the invention is to provide means for mounting and operating elevating arms for use on a tractor whereby latches and other holding elements for retaining the arms in operative positions are obviated.

Another important object of the invention is to provide a harrow having temporary elevating means mounted in combination therewith in which the forward end of the harrow is provided with soil engaging shoes to prevent the forward end of the harrow digging into the ground as trash is removed from the teeth thereof.

A further object of the invention is to provide an attachment for temporarily elevating sections of a harrow in which the device is of a simple and economical construction.

With these and other objects and advantages in view the invention embodies a harrow or a plurality of harrows having beams secured by clamps to upper parts thereof with the beams extended rearwardly and arms carried by a shaft having offset sections therein and rotatably mounted in the extended ends of the beams whereby cables connected to the offset sections of the shafts are adapted to actuate the shafts to swing the arms over and forwardly so that extended ends of the arms are adapted to engage the soil and elevate the harrow as they pass over the center.

Other features and advantages of the invention will appear from the following description taken in connection with the drawings, wherein:

Figure 1 is a plan view showing a plurality of harrow sections illustrating the positions of the elevating arms with the mounting and operating means therefor and also showing shoes extended from the forward ends of the harrow sections for limiting the tilting movement of the sections.

Figure 2 is an end elevational view of the harrow showing the tilting and elevating arms in free positions wherein the arms extend rearwardly from the mounting shafts, said arms also being shown in elevating positions in broken lines wherein with the ground line shown in an inclined position by the broken line the harrow teeth are suspended above the ground with forward ends of the harrow frames supported on the shoes and the rear portions carried by the elevating arms.

Figure 3 is a cross section through the harrow taken on line 3—3 of Fig. 1 also showing the elevating arms in free or rearwardly extended positions.

Figure 4 is a sectional view similar to that shown in Fig. 3 with the parts shown on an enlarged scale and with parts broken away illustrating the mounting connections of the elevating arm carrying means.

Figure 5 is a section illustrating the connections of the elevating arms to the shafts.

Figure 6 is an end elevational view of the beams shown in Fig. 4 showing the bracket for suspending the beams above parts of the harrow frame.

Figure 7 is a view showing an offset section of the shaft upon which the elevating arms are mounted.

Figure 8 is a view showing a crank arm at one end of the elevating arm shaft.

Figure 9 is a view showing a method of mounting an arcuate shoe on the forward end.

Figure 10 is a plan view of a coupling for connecting sections of the elevating arm carrying shafts of the harrow sections.

Figure 11 is an end elevational view of the coupling shown in Fig. 10.

Figure 12 is a view showing offset brackets for supporting beams from the center ribs of the harrow sections.

Figure 13 is a view illustrating a modification wherein rollers are provided on the elevating arms.

Figure 14 is a detail view of the connection between draw bar and chain.

Referring now to the drawings wherein like reference characters denote corresponding parts the elevating attachment of this invention includes beams 10 adapted to be mounted with brackets 11 and 12 on transversely disposed rails 13 and 14, respectively, of harrow sections, elevating arms 15 carried by shafts 16, 17 and 18 rotatably mounted in extended ends of the beams 10 and adapted to be actuated by cables 19, 20 and 21 connected to crank arms 22 and 23 and an offset section 24, respectively and extended to a point adjacent the operator's seat of a towing tractor, and shoes 25 carried by draw bars 26 of the harrow sections.

The beams 10, which may be of wood, such as two-by-fours, or other suitable material are secured to the brackets 11 and 12 with bolts 27 and the brackets are provided with U-shaped clamps 28 having arms 29 and 30 that are secured on the front and rear bars 13 and 14, of the harrow frame with bolts 31. The beams are mounted whereby extended ends 32 project beyond the rear bar 13, as shown in Figs. 2 and 3, and extended ends of the beams are provided with openings 33 in which the shafts 16, 17 and 18 are rotatably mounted.

The elevating arms 15 are secured to the shafts with clamps 34, the ends of which are provided with flanges 35 and 36 that are secured to the arms 15 with bolts 37. Wearing plates 38 are positioned between the flanges and shaft sections to reduce wear on the arms. The arms are provided with a plurality of spaced openings 39 through which the bolts 37 extend whereby the arms are adapted to be adjusted to regulate the distance the teeth 40 of the harrow sections are elevated above the ground. The clamps 34 are provided with set screws 41 for retaining the clamps in adjusted positions on the arms and shafts.

In the design shown the harrow is formed with a plurality of harrow sections 42, 43, 44, 45, and 46 and, as shown in Fig. 1, the beams 10 are connected to the harrow sections such as the sections 42 and 43, and the shaft 16 is mounted in extended ends of the beams. The crank 22, which is connected to the end of the shaft 16 with a pin 47, is provided with a roller 48 that is rotatably mounted on a stud 49 which is secured to a flat portion 50 of the crank 22 with a nut 51 on a threaded end 52 of the stud and the roller 48 is retained in spaced relation to the crank arm 22 with a spacer 53.

The offset or U-shaped section 24 positioned between the shafts 17 and 18, is formed as illustrated in Fig. 7 wherein ends 54 and 55 of arms 56 and 57, respectively, are secured in ends of the shafts 17 and 18 with bolts 19 and 20.

The offset sections of the shaft and crank arms are secured to the shafts with bolts extended through the ends of the shafts and through ends of the offset sections and crank arms and the sections of the shafts are secured together with couplings 58 having opposed set screws 59 in one end and 60 in the opposite end and the set screws are positioned in slots 61 providing longitudinal adjustment between the shafts, such as the shafts 17 and 18. With the shaft sections connected in this manner and with the shaft spaced from the inner surface of the coupling 58, as shown in Fig. 11, a universal joint is provided permitting bending or flexibility in the shaft to compensate for unevenness in the ground. The crank arms are removably mounted in the shaft sections so that the parts are readily taken apart and also readily assembled.

The forward ends of the draw bars of the harrow sections are provided with spaced openings 62 through which bolts 63 extend. The bolts secure the shoes 25 on the draw bars and, as shown in Fig. 9, heads 64 of the bolts are positioned in countersunk openings 65. With the trailing end of the harrow frame tilted upwardly, as indicated by the broken lines in Fig. 2, the forward end dips downwardly and with the shoes 25 on the forward ends of the draw bars the shoes travel upon the surface of the soil retaining the harrows in an inclined position in which the harrow remains for a comparatively short period of time.

With the parts designed and assembled as illustrated and described the elevating arms 15, which are provided with arcuate surfaces 66, are set in relation to the crank arms 22 and 23 and offset sections 24 whereby the crank arms and offset sections extend upwardly and rearwardly, as shown in Figs. 3 and 2, so that a force applied to the cables draws the arms 15 upwardly and over on the forward sides of the shafts whereby the forward ends 67 of the arms 15 dig into the ground causing the shaft to extend upwardly with the harrow teeth leaving the soil and with trash accumulated on the teeth free to drop to the ground. In this forward movement the arms assume substantially vertical positions as the center of the shafts passes over the points of the arms, as illustrated in Fig. 2 wherein the relation of the harrow to the ground is indicated, the ground being indicated by the numeral 68.

The beams 10 are mounted over the bars 13 and 14 and the harrow frames include additional bars 69, 70, and 71 which are secured in longitudinally disposed intermediate bars 72 and 73 of each of the frames and also in the draw bars 26. The harrow frames are also reinforced with diagonally disposed braces 74 and 75.

The draw bars are connected by a chain 76 to a continuous cross bar 77 and the bar 77 is connected to a bar 78 with struts 79 and 80 and diagonal braces 81 and 82. The bar 78 is adapted to be connected to a tractor with cables or struts 83 and 84.

The draw bars are provided with notches 85 in which links 86 of the chains are secured with latches 87.

It will be understood that the elevating attachment may be mounted on a harrow of any suitable type or design and the harrow may be provided with spike teeth as shown, or with spring teeth, as may be desired.

In the design shown the harrow is provided with spike teeth 40 and the position of the teeth is adjustable by a hand lever 88 which is retained in adjusted position with a gear segment 89 and the segment is connected to a bar 90 that is pivotally connected to upper ends of the teeth.

The beam supporting brackets for the center ribs of the harrow sections are formed as illustrated in Fig. 12 wherein brackets 91 having offset sections 92 therein are attached to the center ribs 93 with bolts 94 and the upper ends are attached to the beams 10 with bolts 95, similar to the bolts 27.

The ends of the elevating arms 15 are also provided with thickening pads or blocks 96 to increase the area at the ends of the arms to prevent the arms sinking into the soil and, as illustrated in Fig. 13, the ends of arms 97, similar to the arms 15 are provided with rollers 98 in bearings 99.

*Operation*

With the parts designed and assembled as illustrated and described the beams 10 of the attachment are secured to the bars 13 and 14 of a harrow particularly as shown in Fig. 4 and, in the free position, the arms 15 extend rearwardly dragging over the surface of the soil, as shown in Figs. 2 and 3. The harrow may be of conventional design and any suitable number of harrows may be used in combination. With the harrows arranged as illustrated in Fig. 1 three cables are used, two of which are attached to the crank arms 22 and 23 of the shafts 16 and 17 and the other to the offset section 24 of the shaft 18. With the parts assembled in this manner the harrow is adapted to function with the teeth breaking up the soil, and upon the accumulation of trash in the teeth of the harrow the operator pulls the cables 19, 20 and 21 forwardly drawing the arms 15 over as indicated by the arrows, in Fig. 2, whereby the points of the arms drop downwardly and into engagement with the soil. Upon forward movement of the harrow the shafts, upon which the arms are mounted move upwardly over the points of the arms with the result that the harrow teeth are elevated from the soil and trash accumulated thereon drops by gravity to the ground. In this movement the harrow teeth move forwardly depositing trash and the relatively clean teeth drop into the soil with the arms 15 assuming the position shown in full lines in Figs. 2 and 3.

It will be understood that modifications, within the scope of the appended claim, may be made in the design and arrangement of the parts without departing from the spirit of the invention.

What is claimed is:

In an agricultural implement, a plurality of harrow sections each including a frame having depending teeth and each of said harrow sections including horizontally disposed rails, arcuate shoes mounted on extended ends of the harrow sections, a plurality of spaced parallel beams connected to said rails and extending rearwardly therefrom, shafts rotatably mounted in the extended rear ends of the beams, cranks connected to said shafts, couplings connecting certain of said shafts together, cables connected to said cranks, said cables being extended to a point adjacent the operator's seat of a towing tractor, arms mounted on said shafts, pads on the ends of the arms, said arms being positioned to drag over the surface of the ground whereby when a force is applied to the cables from a point forwardly of the harrow sections, the arms swing upwardly over the shafts with the ends dropping downwardly and engaging the soil, the arms being of such a length so that engagement of the extended ends thereof with the soil with the harrow sections moving forwardly elevates the harrow frame and teeth so as to facilitate downward movement by gravity of trash and the like.

References Cited in the file of this patent

UNITED STATES PATENTS

| | | |
|---|---|---|
| 5,687 | Shelabarger | Aug. 1, 1848 |
| 137,975 | Sweeny | Apr. 15, 1873 |
| 2,502,835 | Dunsdon | Apr. 4, 1950 |

FOREIGN PATENTS

| | | |
|---|---|---|
| 537,147 | France | Feb. 24, 1922 |
| 521,064 | Great Britain | May 10, 1940 |